(12) United States Patent
Kawata et al.

(10) Patent No.: US 11,505,709 B2
(45) Date of Patent: Nov. 22, 2022

(54) AQUEOUS INK

(71) Applicant: KAO CORPORATION, Tokyo (JP)

(72) Inventors: Daiki Kawata, Wakayama (JP);
Masashi Inoue, Wakayama (JP);
Tomoaki Il, Yokohama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 16/957,189

(22) PCT Filed: Dec. 25, 2018

(86) PCT No.: PCT/JP2018/047495
§ 371 (c)(1),
(2) Date: Jun. 23, 2020

(87) PCT Pub. No.: WO2019/131598
PCT Pub. Date: Jul. 4, 2019

(65) Prior Publication Data
US 2020/0332137 A1   Oct. 22, 2020

(30) Foreign Application Priority Data

Dec. 27, 2017 (JP) .............................. JP2017-252510

(51) Int. Cl.
*C09D 11/107* (2014.01)
*B41M 5/00* (2006.01)
*C09D 11/033* (2014.01)
*C09D 11/322* (2014.01)
(Continued)

(52) U.S. Cl.
CPC .............. *C09D 11/107* (2013.01); *B41J 2/01* (2013.01); *B41J 2/2107* (2013.01); *B41M 5/0023* (2013.01); *C09D 11/033* (2013.01); *C09D 11/322* (2013.01)

(58) Field of Classification Search
CPC ........ B41J 25/001; B41J 25/34; B41J 25/003; B41J 2/21; B41J 25/312; B41J 2025/008; B41J 2202/21; B41J 2/17596; B41J 2/16508; B41J 2/1652; B41J 2/16538; B41J 2/175; B41J 2/17563; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 11/0021; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/107; C09D 11/326; B41M 5/0011; B41M 5/0017; B41M 5/0023; B41M 5/0047; B41M 7/00; B41M 7/0072; B41M 5/52; B41M 5/5218; B41M 2/04588; B41M 2/04595; B41M 2/04586; B41M 2/14274; B41M 5/5227; B41M 7/0081; B41M 3/006; B41M 3/003; G02B 5/20; G02B 5/223; C08K 3/11; C08K 2003/2237

See application file for complete search history.

(56) References Cited

U.S. PATENT DOCUMENTS

| 5,938,829 | A | * | 8/1999 | Higashiyama | ......... C09D 11/30 |
| | | | | | 106/31.58 |
| 9,725,612 | B2 | * | 8/2017 | Ashizawa | .................. B41J 2/04 |
| 2004/0242726 | A1 | | 12/2004 | Waki et al. | |

(Continued)

FOREIGN PATENT DOCUMENTS

| JP | 2005-15765 A | 1/2005 |
| JP | 2007-152768 A | 6/2007 |

(Continued)

OTHER PUBLICATIONS

International Search Report, issued in PCT/JP2018/047495, PCT/ISA/210, dated Mar. 12, 2019.

(Continued)

*Primary Examiner* — Manish S Shah
(74) *Attorney, Agent, or Firm* — Birch, Stewart, Kolasch & Birch, LLP

(57) ABSTRACT

The present invention relates to [1] a water-based ink containing water-insoluble polymer particles (A), an organic solvent (B) and water, in which a polymer constituting the water-insoluble polymer particles (A) is in the form of a crosslinked polymer; the organic solvent (B) contains a polyhydric alcohol ether; and a rate of change in viscosity of the organic solvent (B) as calculated according to the formula (1) is not more than 140%, and [2] a printing method of printing characters or images on a printing medium using the water-based ink described in the above [1], in which a water absorption of the printing medium per a unit surface area thereof as measured by contacting the printing medium with pure water for 100 milliseconds is not less than 0 g/m$^2$ and not more than 10 g/m$^2$.

15 Claims, No Drawings

(51) Int. Cl.
*B41J 2/01* (2006.01)
*B41J 2/21* (2006.01)

(56) References Cited

U.S. PATENT DOCUMENTS

| | | |
|---|---|---|
| 2005/0036021 A1 | 2/2005 | Ito et al. |
| 2008/0254265 A1 | 10/2008 | Ito et al. |
| 2011/0069108 A1 | 3/2011 | Fukuda |
| 2011/0169900 A1 | 7/2011 | Annable et al. |
| 2011/0257309 A1 | 10/2011 | Yoshida et al. |
| 2011/0263752 A1* | 10/2011 | Hiraishi ............... C09D 11/322 523/310 |
| 2014/0267520 A1 | 9/2014 | Toda et al. |
| 2016/0130453 A1 | 5/2016 | Eguchi et al. |
| 2017/0037268 A1 | 2/2017 | Wakabayashi et al. |
| 2018/0142110 A1 | 5/2018 | Maeda |
| 2018/0187034 A1 | 7/2018 | Takeno et al. |
| 2018/0258200 A1 | 9/2018 | Matsumoto |

FOREIGN PATENT DOCUMENTS

| | | |
|---|---|---|
| JP | 2008-179778 A | 8/2008 |
| JP | 2009-275125 A | 11/2009 |
| JP | 2009-287015 A | 12/2009 |
| JP | 2010-144095 A | 7/2010 |
| JP | 2011-127064 A | 6/2011 |
| JP | 2012-504675 A | 2/2012 |
| JP | 2013-230638 A | 11/2013 |
| JP | 2014-198466 A | 10/2014 |
| JP | 2015-13990 A | 1/2015 |
| JP | 2015-124223 A | 7/2015 |
| JP | 2015-160860 A | 9/2015 |
| JP | 2017-43653 A | 3/2017 |
| WO | WO-2010/071177 A1 | 6/2010 |
| WO | WO 2016/104294 A1 | 6/2016 |
| WO | WO 2016/181797 A1 | 11/2016 |
| WO | WO 2016/208719 A1 | 12/2016 |
| WO | WO 2017/115659 A1 | 7/2017 |
| WO | WO 2017/145882 A1 | 8/2017 |

OTHER PUBLICATIONS

Extended European Search Report for European Application No. 18895584.3, dated Oct. 25, 2021.

* cited by examiner

AQUEOUS INK

FIELD OF THE INVENTION

The present invention relates to a water-based ink, and a printing method using the water-based ink.

BACKGROUND OF THE INVENTION

In the commercial or industrial printing application fields, it has been required to print characters or images not only on a high-water absorbing printing medium such as those printing media conventionally called a plain paper or a copying paper, but also on a printing medium for commercial printing purposes such as a low-water absorbing coated paper such as an offset coated paper, and a non-water absorbing resin film such as a PET (polyethylene terephthalate) film, a PVC (polyvinyl chloride) film, a PE (polyethylene) film, a PP (polypropylene) film, a NY (nylon) film and the like.

In the case where printing is conducted on the low-water absorbing or non-water absorbing printing medium, there tends to occur such a problem that an ink used therein is insufficient in adhesion to the printing medium owing to slow absorption or no absorption of liquid components of the ink, and is therefore deteriorated in rub fastness and the like.

In addition, inks using a pigment as a colorant thereof have been proposed from the viewpoint of improving water resistance and weathering resistance of the resulting printed material. The pigment used in the inks is usually dispersed in an ink vehicle using a polymer dispersant. However, molecules of the pigment are incapable of being uniformly dissolved in the ink vehicle unlike dyes. For this reason, there have been proposed various methods for maintaining a good dispersed state of the pigment in the inks to improve ejection properties, etc., of the inks upon ink-jet printing.

For example, WO 2016/104294A (Patent Literature 1) discloses a water-based ink, etc., which are capable of exhibiting excellent ejection properties and are also capable of forming printed characters or images having excellent uniformity even when printed on a low-water absorbing printing medium, said water-based ink, etc., containing a pigment, a water insoluble polymer, an acetylene glycol-based nonionic surfactant whose HLB value falls within a specific range, a specific polyether-modified silicone and an organic solvent. In Examples of the Patent Literature 1, as the organic solvent, there are described propylene glycol, diethylene glycol monoisopropyl ether and the like.

JP 2015-124223A (Patent Literature 2) discloses a water-based ink for ink-jet printing, etc., which are excellent in ejection stability, etc., in particular, excellent in quick-drying fixing properties, etc., when forming printed characters or images on a low-water absorbing printing medium, said water-based ink, etc., containing a pigment, a water-insoluble polymer, an organic solvent and water, in which the organic solvent contains diethylene glycol isopropyl ether and an organic solvent having a 1-octanol/water partition coefficient that is smaller than that of the diethylene glycol isopropyl ether.

JP 2015-13990A (Patent Literature 3) discloses a water-based ink for ink-jet printing which is excellent in rub fastness, etc., when printed on a low-water absorbing printing medium, said water-based ink, etc., containing pigment-containing water-insoluble polymer particles, water-insoluble polymer particles, an organic solvent and water, in which a water-insoluble polymer constituting the pigment-containing water-insoluble polymer particles contains a constitutional unit derived from a specific hydrophilic nonionic monomer in a specific amount range on the basis of a total amount of whole constitutional units thereof, the organic solvent contains an organic solvent having a boiling point of not lower than 90° C., a weighted mean value of a boiling point of the organic solvent is not higher than 250° C., and a content of the organic solvent in the water-based ink falls within a specific range. In Examples of the Patent Literature 3, as the organic solvent, there are described glycerin, propylene glycol and the like.

JP 2014-198466A (Patent Literature 4) discloses an aqueous ink for use in an ink-jet printing apparatus which can be firmly fixed on a non-porous substrate and is free of clogging of nozzles even after interrupting printing operation thereof for a long period of time, said aqueous ink, etc., containing a colorant, an emulsion resin, water and a water-soluble solvent. In Examples of the Patent Literature 4, as the organic solvent, there are described diethylene glycol monobutyl ether, 1,3-butanediol and the like.

JP 2015-160860A (Patent Literature 5) discloses an ink composition that is capable of exhibiting not only good fixing properties on a printing medium, but also good reliability such as ejection stability from a nozzle head and prevention of clogging therein, etc., said ink composition, etc., containing water, a pigment, a resin emulsion and a water-soluble clathrate compound, in which a ratio between a content of the water-soluble clathrate compound and a content of the resin emulsion on the basis of a mass ratio therebetween falls within a specific range. In Examples of the Patent Literature 5, as the organic solvent, there are described glycerin, triethylene glycol monobutyl ether and the like.

SUMMARY OF THE INVENTION

The present invention relates to a water-based ink containing water-insoluble polymer particles (A), an organic solvent (B) and water, in which:

a polymer constituting the water-insoluble polymer particles (A) is in the form of a crosslinked polymer;

the organic solvent (B) contains a polyhydric alcohol ether; and a rate of change in viscosity of the organic solvent (B) as calculated according to the following formula (1) is not more than 140%, $$\text{Rate of change in viscosity (\%)} = (\eta_B/\eta_{50}) \times 100 \quad (1)$$

wherein $\eta_B$ is a viscosity of the organic solvent (B) as measured at 32° C.; and $\eta_{50}$ is a viscosity of a 50% by mass aqueous solution of the organic solvent (B) as measured at 32° C.

DETAILED DESCRIPTION OF THE INVENTION

The water-based inks containing specific organic solvents described in the Patent Literatures 1, 2 and 4 tend to be sometimes insufficient in ejection stability (ejection restorability) after interrupting ejection of the inks for a certain period of time upon ink-jet printing, since the water-insoluble polymer or the emulsion resin used in these inks has no crosslinked structure.

The water-based inks described in the Patent Literatures 3 and 5 tend to be insufficient in not only drying properties when printed on a low-water absorbing printing medium, but also ejection stability, since the water-insoluble polymer particles or the resin emulsion used in the inks contain a self-crosslinkable polymer and therefore the inks tend to suffer from increase in viscosity thereof upon drying of the inks. It is also required that these water-based inks are improved in rub fastness. In Example 15 of the Patent Literature 3, there were used the crosslinked pigment-containing water-insoluble polymer particles. However, it is further required that these water-based inks are improved in drying properties, rub fastness and ejection stability.

Thus, the conventional techniques have failed to obtain such a water based ink that is capable of satisfying all of ejection stability, as well as drying properties and rub fastness when printed on a low-water absorbing printing medium.

The present invention relates to a water-based ink that is excellent in ejection stability, and is capable of providing a printed material that is excellent in drying properties and rub fastness when printed on a low-water absorbing printing medium, and a printing method using the water-based ink.

The present inventors have found that by using such a water-based ink containing water-insoluble polymer particles, an organic solvent and water in which the water-insoluble polymer particles are formed of a crosslinked polymer, the organic solvent contains a polyhydric alcohol ether, and a rate of change in viscosity of the organic solvent is controlled to a specific range, it is possible to solve the aforementioned conventional problems.

That is, the present invention relates to the following aspects [1] and [2].

[1] A water-based ink containing water-insoluble polymer particles (A), an organic solvent (B) and water, in which:

a polymer constituting the water-insoluble polymer particles (A) is in the form of a crosslinked polymer;

the organic solvent (B) contains a polyhydric alcohol ether; and a rate of change in viscosity of the organic solvent (B) as calculated according to the following formula (1) is not more than 140%, $$\text{Rate of change in viscosity (\%)} = (\eta_B/\eta_{50}) \times 100 \quad (1)$$

wherein $\eta_B$ is a viscosity of the organic solvent (B) as measured at 32° C.; and $\eta_{50}$ is a viscosity of a 50% by mass aqueous solution of the organic solvent (B) as measured at 32° C.

[2] A printing method of printing characters or images on a printing medium using the water-based ink according to the above aspect [1], in which a water absorption of the printing medium per a unit surface area thereof as measured by contacting the printing medium with pure water for 100 milliseconds is not less than 0 g/m² and not more than 10 g/m².

In accordance with the present invention, there is provided a water-based ink that is excellent in ejection stability, and is capable of providing a printed material that is excellent in drying properties and rub fastness when printed on a low-water absorbing printing medium, and a printing method using the water-based ink.

[Water-Based Ink]

The water-based ink of the present invention (hereinafter also referred to merely as an "ink") is such a waster-based ink that contains water-insoluble polymer particles (A), an organic solvent (B) and water, in which: a polymer constituting the water-insoluble polymer particles (A) is in the form of a crosslinked polymer; the organic solvent (B) contains a polyhydric alcohol ether; and a rate of change in viscosity of the organic solvent (B) as calculated according to the following formula (1) is not more than 140%, $$\text{Rate of change in viscosity (\%)} = (\eta_B/\eta_{50}) \times 100 \quad (1)$$

wherein $\eta_B$ is a viscosity of the organic solvent (B) as measured at 32° C.; and $\eta_{50}$ is a viscosity of a 50% by mass aqueous solution of the organic solvent (B) as measured at 32° C.

Meanwhile, the term "water-based" as used herein means that water has a largest content among components of a medium contained in the ink. The term "low-water absorbing" as used herein is intended to include both concepts of "low-water absorbing properties" and "non-water absorbing properties", and the low-water absorbing printing medium means a printing medium having a water absorption of not less than 0 g/m² and not more than 10 g/m² per a unit surface area thereof as measured under the condition that a contact time between the printing medium and pure water is 100 milliseconds. The aforementioned water absorption of the printing medium may be measured by the method described in Examples below.

The meaning of the term "water-insoluble" as used herein is described hereinlater in the paragraph for explanation of the below-mentioned uncrosslinked polymer.

In addition, the term "printing" as used in herein means a concept that includes printing or typing operation for printing characters or images.

The water-based ink of the present invention is excellent in drying properties and rub fastness when printed on a low-water absorbing printing medium, and therefore can be suitably used as an ink for flexographic printing, an ink for gravure printing or an ink for ink-jet printing. In addition, the water-based ink of the present invention is also excellent in ejection stability upon ink-jet printing, and therefore is preferably used as a water-based ink for ink-jet printing.

The water-based ink of the present invention is excellent in ejection stability, and is capable of providing a printed material that is excellent in drying properties and rub fastness when printed on a low-water absorbing printing medium. The reason why the aforementioned advantageous effects can be attained by the present invention is estimated as follows though it is not clearly determined yet.

That is, the rate of change in viscosity of the organic solvent as used in the present invention means a ratio of a viscosity of the organic solvent contained in the ink as measured at 32° C. to a viscosity of a 50% by mass aqueous solution of the organic solvent prepared by dissolving the organic solvent in water as measured at 32° C. The rate of change in viscosity of the organic solvent represents an affinity of the organic solvent to water, i.e., a degree of hydrophilicity of the organic solvent, and is used as an index showing a degree of change in viscosity of the ink in the case where water is evaporated from the ink upon drying of the ink so that the organic solvent is allowed to remain in the ink. It is indicated that as the rate of change in viscosity of the organic solvent is increased, the hydrophilicity of the organic solvent becomes higher, and the increase in viscosity of the ink upon drying of the ink becomes larger.

The organic solvent containing the polyhydric alcohol ether tends to be prevented from suffering from excessively large increase in the rate of change in viscosity thereof. When the rate of change in viscosity of the organic solvent is not more than 140%, the hydrophilicity of the organic solvent is not excessively high and lies within an adequate range, so that the ink hardly suffers from increase in its viscosity upon drying and therefore can be improved in ejection stability. In addition, it is considered that since the ink hardly suffers from increase in its viscosity even after impacting the ink onto the printing medium, evaporation of water from the ink is promoted, so that the ink can be improved in drying properties.

Furthermore, in the water-insoluble polymer particles having a crosslinked structure which are contained in the ink, the polymer in the polymer particles is prevented from undergoing swelling or dissolution by the organic solvent containing the polyhydric alcohol ether owing to its crosslinked structure, and the ink is also prevented from suffering from increase in viscosity thereof owing to the polymer and therefore can be improved in ejection stability.

On the other hand, it is considered that the crosslinked structure tends to cause increase in elastic modulus of the polymer, so that the ink tends to be deteriorated in film-forming properties on a printing medium, and suffer from deterioration in rub fastness of the resulting printed material. However, in the present invention, since the rate of change in viscosity of the organic solvent is controlled to not more than 140%, the hydrophilicity of the organic solvent is adjusted into an adequate range, and the degree of swelling of the water-insoluble polymer particles having the crosslinked structure with the organic solvent can be well controlled, so that the increase in elastic modulus of the polymer owing to the crosslinked structure can be relaxed while suppressing increase in viscosity of the resulting ink, and therefore the ink can exhibit high film-forming properties. As a result, it is estimated that the resulting printed material can be improved in rub fastness.

It is considered that when the rate of change in viscosity of the organic solvent is more than 140%, the degree of swelling of the water-insoluble polymer particles having the crosslinked structure with the organic solvent tends to be insufficient owing to excessively high hydrophilic properties of the organic solvent, so that the resulting printed material can be hardly improved in rub fastness.

Furthermore, the organic solvent having too high hydrophobicity to prepare a 50% by mass aqueous solution thereof tends to cause excessively increased swelling of the water-insoluble polymer particles having the crosslinked structure with the organic solvent, and therefore tends to be unsuitable for use in water-based inks because of its low solubility in water.

<Water-Insoluble Polymer Particles (A)>

The polymer constituting the water-insoluble polymer particles (A) (hereinafter also referred to merely as "polymer particles (A)") is in the form of a crosslinked polymer. For this reason, it is considered that the polymer is adequately swelled with the organic solvent (B) while suppressing increase in viscosity of the ink to thereby inhibit increase in elastic modulus of the polymer owing to the crosslinked structure, so that the resulting ink can be improved in ejection stability, drying properties and rub fastness.

As the polymer constituting the polymer particles (A), there may be mentioned a crosslinked polymer obtained by crosslinking an uncrosslinked polymer with a crosslinking agent, a crosslinked polymer containing a constitutional unit derived from a polyfunctional monomer, and the like. Among these polymers, the polymer constituting the polymer particles (A) is preferably in the form of a crosslinked polymer (A1) obtained by crosslinking an uncrosslinked polymer (a1) with a crosslinking agent.

From the viewpoint of improving ejection stability, drying properties and rub fastness of the resulting water-based ink, the polymer particles (A) are preferably pigment-free polymer particles. The polymer particles (A) are preferably used in the form of a water dispersion prepared by dispersing the polymer particles (A) in an aqueous medium. The water dispersion of the polymer particles (A) may also contain a dispersant such as a surfactant, if required. The water dispersion of the polymer particles (A) used herein may be either an appropriately synthesized product or a commercially available product.

[Crosslinked Polymer (A1)]

The polymer (a1) in an uncrosslinked state (hereinafter also referred to as an "uncrosslinked polymer (a1)") used herein may be either a water-soluble polymer or a water-insoluble polymer. In the case where the uncrosslinked polymer (a1) is a water-soluble polymer, such a water-soluble polymer can also be usable as long as the polymer is converted into a water-insoluble polymer via the crosslinking treatment. Among them, the uncrosslinked polymer (a1) is preferably a water-insoluble polymer from the viewpoint of improving ejection stability and rub fastness of the resulting water-based ink.

The terms "water-soluble" and "water-insoluble" as used herein have the following meanings. That is, when a polymer is dried to a constant weight at 105° C. for 2 hours and then dissolved in 100 g of water at 25° C. until reaching a saturation concentration thereof, in the case where the solubility in water of the polymer is more than 10 g, the polymer is regarded as being water-soluble, whereas in the case where the solubility in water of the polymer is not more than 10 g, the polymer is regarded as being water-insoluble. The solubility in water of the water-insoluble polymer is preferably not more than 5 g and more preferably not more than 1 g. In the case where the water-insoluble polymer is in the form of the below-mentioned acid group-containing polymer, the aforementioned solubility means a solubility in water of the water-insoluble polymer whose acid groups are neutralized completely (i.e., 100%) with sodium hydroxide.

The uncrosslinked polymer (a1) contains a reactive group that is capable of reacting with the crosslinking agent. Examples of the reactive group include an acid group such as a carboxy group, a sulfonic group, a phosphoric group, etc., an amino group, a hydroxy group, an isocyanate group, an epoxy group, and the like. Among these reactive groups, preferred is an acid group, and more preferred is a carboxy group.

(Acid Group-Containing Uncrosslinked Polymer)

The acid value of the acid group-containing uncrosslinked polymer is preferably not less than 5 mgKOH/g, more preferably not less than 50 mgKOH/g, even more preferably not less than 100 mgKOH/g, further even more preferably not less than 150 mgKOH/g and still further even more preferably not less than 200 mgKOH/g, and is also preferably not more than 320 mgKOH/g, more preferably not more than 300 mgKOH/g and even more preferably not more than 270 mgKOH/g, from the viewpoint of improving ejection stability, drying properties and rub fastness of the resulting water-based ink.

The acid value of the acid group-containing uncrosslinked polymer may be measured by the method described in Examples below, and may also be calculated from mass ratios of the monomers constituting the uncrosslinked polymer.

As the acid group-containing uncrosslinked polymer, there may be mentioned at least one polymer selected from the group consisting of condensation-based polymers such as polyurethanes, polyesters, etc.; and vinyl-based polymers such as acrylic resins, styrene-based resins, acrylic-styrene-based resins, butadiene-based resins, styrene-butadiene-based resins, vinyl chloride-based resins, vinyl acetate-based resins, acrylic silicone-based resins, etc. Among these acid group-containing uncrosslinked polymers, from the viewpoint of improving ejection stability, drying properties and rub fastness of the resulting water-based ink, preferred are vinyl-based polymers that are obtained by addition-polymerizing a vinyl compound as a monomer thereof.

The acid group-containing uncrosslinked polymer is preferably a carboxy group-containing uncrosslinked polymer that contains a constitutional unit derived from (a1-1) a carboxylic acid monomer (hereinafter also referred to merely as a "component (a1-1)") and a constitutional unit derived from (a1-2) a hydrophobic monomer (hereinafter also referred to merely as a "component (a1-2)") from the viewpoint of improving dispersion stability of the polymer particles as well as from the viewpoint of improving ejection stability, drying properties and rub fastness of the resulting water-based ink. The carboxy group-containing uncrosslinked polymer may further contain a constitutional unit derived from (a1-3) a nonionic monomer (hereinafter also referred to merely as a "component (a1-3)").

[(a1-1) Carboxylic Acid Monomer]

The carboxylic acid monomer (a1-1) is used as a monomer component of the carboxy group-containing uncrosslinked polymer from the viewpoint of improving dispersion stability of the polymer particles as well as from the viewpoint of improving ejection stability, drying properties and rub fastness of the resulting water-based ink.

Examples of the carboxylic acid monomer include acrylic acid, methacrylic acid, crotonic acid, itaconic acid, maleic acid, fumaric acid, citraconic acid, 2-methacryloyloxymethylsuccinic acid, and the like. Among these carboxylic acid monomers, preferred is at least one compound selected from the group consisting of acrylic acid and methacrylic acid, and more preferred is acrylic acid.

[(a1-2) Hydrophobic Monomer]

The hydrophobic monomer (a1-2) is used as a monomer component of the carboxy group-containing uncrosslinked polymer from the viewpoint of improving dispersion stability of the polymer particles as well as from the viewpoint of improving ejection stability, drying properties and rub fastness of the resulting water-based ink. As the hydrophobic monomer (a1-2), preferred is at least one monomer selected from the group consisting of a (meth)acrylate containing a hydrocarbon group derived from an aliphatic alcohol and an aromatic group-containing monomer.

The term "(meth)acrylate" as used in the present specification means at least one compound selected from the group consisting of an acrylate and a methacrylate.

The (meth)acrylate containing a hydrocarbon group derived from an aliphatic alcohol preferably contains a hydrocarbon group derived from an aliphatic alcohol having not less than 1 and not more than 22 carbon atoms. Examples of the (meth)acrylate containing a hydrocarbon group derived from an aliphatic alcohol include (meth)acrylates containing a linear alkyl group, such as methyl (meth) acrylate, ethyl (meth)acrylate, propyl (meth)acrylate, butyl (meth)acrylate, pentyl (meth)acrylate, octyl (meth)acrylate, decyl (meth)acrylate, dodecyl (meth)acrylate, stearyl (meth) acrylate, etc.; (meth)acrylates containing a branched alkyl group, such as isopropyl (meth)acrylate, isobutyl (meth) acrylate, tert-butyl (meth)acrylate, isopentyl (meth)acrylate, isooctyl (meth)acrylate, isodecyl (meth)acrylate, isododecyl (meth)acrylate, isostearyl (meth)acrylate, 2-ethylhexyl (meth)acrylate, etc.; (meth)acrylates containing an alicyclic alkyl group, such as cyclohexyl (meth)acrylate, etc.; and the like. Among these (meth)acrylates, more preferred are those (meth)acrylates containing an alkyl group having not less than 1 and not more than 10 carbon atoms, and even more preferred are those (meth)acrylates containing an alkyl group having not less than 1 and not more than 8 carbon atoms.

The aromatic group-containing monomer is preferably in the form of a vinyl monomer containing an aromatic group having not less than 6 and not more than 22 carbon atoms which may also contain a substituent group containing a hetero atom, and more preferably at least one monomer selected from the group consisting of a styrene-based monomer, an aromatic group-containing (meth)acrylate and a styrene-based macromonomer. The molecular weight of the aromatic group-containing monomer is preferably less than 500.

As the styrene-based monomer, preferred are styrene, α-methyl styrene, 2-methyl styrene and divinyl benzene, and more preferred are styrene and α-methyl styrene.

As the aromatic group-containing (meth)acrylate, preferred are benzyl (meth)acrylate, phenoxyethyl (meth)acrylate, etc., and more preferred is benzyl (meth)acrylate.

The styrene-based macromonomer is in the form of a compound containing a polymerizable functional group at one terminal end thereof and having a number-average molecular weight of preferably not less than 500 and more preferably not less than 1,000, and also preferably not more than 100,000 and more preferably not more than 10,000. The polymerizable functional group bonded to one terminal end of the styrene-based macromonomer is preferably an acryloyloxy group or a methacryloyloxy group and more preferably a methacryloyloxy group.

Specific examples of commercially available products of the styrene-based macromonomer include "AS-6(S)", "AN-6(S)" and "HS-6(S)" (tradenames) all available from Toagosei Co., Ltd., etc.

The hydrophobic monomer (a1-2) is preferably an aromatic group-containing monomer, more preferably a styrene-based monomer, and even more preferably at least one monomer selected from the group consisting of styrene and α-methyl styrene.

[(a1-3) Nonionic Monomer]

In the carboxy group-containing uncrosslinked polymer, a nonionic monomer (a1-3) is further used as a monomer component of the polymer from the viewpoint of improving dispersion stability of the polymer particles. That is, the carboxy group-containing uncrosslinked polymer may further contain a constitutional unit derived from the nonionic monomer (a1-3). Examples of the nonionic monomer (a1-3) include hydroxyethyl (meth)acrylates such as 2-hydroxyethyl (meth)acrylate, 3-hydroxypropyl (meth)acrylate, etc.; polyalkylene glycol (meth)acrylates such as polypropylene glycol (n=2 to 30 wherein n represents an average molar number of addition of oxypropylene groups: hereinafter n also represents an average molar number of addition of oxyalkylene groups) (meth)acrylate, polyethylene glycol (n=2 to 30) (meth)acrylate, etc.; alkoxy polyalkylene glycol (meth)acrylates such as methoxy polyethylene glycol (n=1 to 30) (meth)acrylate, etc.; phenoxy (ethylene glycol/propylene glycol copolymer) (n=1 to 30 in which n for ethylene glycol is 1 to 29) (meth)acrylate, etc.; and the like.

Specific examples of commercially available products of the component (a1-3) include "NK ESTER M-20G", "NK ESTER M-40G", "NK ESTER M-90G", "NK ESTER M-230G" and the like as products available from Shin-Nakamura Chemical Co., Ltd.; and "BLEMMER PE-90", "BLEMMER PE-200", "BLEMMER PE-350" and the like, "BLEMMER PME-100", "BLEMMER PME-200", "BLEMMER PME-400" and the like, "BLEMMER PP-500", "BLEMMER PP-800", "BLEMMER PP-1000"

and the like, "BLEMMER AP-150", "BLEMMER AP-400", "BLEMMER AP-550" and the like, and "BLEMMER 50PEP-300", "BLEMMER 50POEP-800B", "BLEMMER 43PAPE-600B" and the like as products available from NOF Corporation.

The aforementioned components (a1-1) to (a1-3) may be respectively used alone or in the form of a mixture of any two or more thereof.

As described above, the uncrosslinked polymer (a1) is preferably the acid group-containing uncrosslinked polymer, more preferably the carboxy group-containing uncrosslinked polymer, and even more preferably a polymer containing a (meth)acrylic resin that contains a constitutional unit derived from at least one carboxylic acid monomer (a1-1) selected from the group consisting of acrylic acid and methacrylic acid, and a constitutional unit derived from at least one hydrophobic monomer (a1-2) selected from the group consisting of an alkyl (meth)acrylate monomer and an aromatic group-containing monomer. More specifically, the polymer constituting the polymer particles (A) preferably contains a crosslinked (meth)acrylic resin.

In the present invention, the (meth)acrylic resin used herein means a resin containing a constitutional unit derived from acrylic acid or methacrylic acid.

The content of the crosslinked (meth)acrylic resin in the polymer constituting the polymer particles (A) is preferably not less than 80% by mass and more preferably not less than 90% by mass, and is also preferably not more than 100% by mass.

(Contents of Respective Components in Polymerizable Monomers or Contents of Respective Constitutional Units in Carboxy Group-Containing Uncrosslinked Polymer)

The contents of the respective components (a1-2) and (a1-2) in the polymerizable monomers upon production of the carboxy group-containing uncrosslinked polymer (contents of non-neutralized components; hereinafter defined in the same way), or the contents of the constitutional units derived from the respective components (a1-2) and (a1-2) in the carboxy group-containing uncrosslinked polymer are as follows, from the viewpoint of improving dispersion stability of the polymer particles as well as from the viewpoint of improving ejection stability, drying properties and rub fastness of the resulting water-based ink.

The content of the component (a1-1) is preferably not less than 10% by mass, more preferably not less than 20% by mass and even more preferably not less than 25% by mass, and is also preferably less than 75% by mass, more preferably less than 60% by mass and even more preferably less than 50% by mass.

The content of the component (a1-2) is preferably not less than 25% by mass, more preferably not less than 40% by mass and even more preferably not less than 50% by mass, and is also preferably less than 90% by mass, more preferably less than 80% by mass and even more preferably less than 75% by mass.

The mass ratio of the component (a1-1) to the component (a1-2) [component (a1-1)/component (a1-2)] is preferably not less than 0.1, more preferably not less than 0.2 and even more preferably not less than 0.3, and is also preferably not more than 1.5, more preferably not more than 1.2, even more preferably not more than 1.0 and further even more preferably not more than 0.6.

The uncrosslinked polymer (a1) used herein may be in the form of either an appropriately synthetized product or a commercially available product.

The weight-average molecular weight of the uncrosslinked polymer (a1) is preferably not less than 3,000, more preferably not less than 5,000 and even more preferably not less than 10,000, and is also preferably not more than 100,000, more preferably not more than 50,000 and even more preferably not more than 30,000. The uncrosslinked polymer (a1) whose weight-average molecular weight lies within the aforementioned range is capable of allowing the polymer particles to exhibit good dispersion stability.

Meanwhile, the weight-average molecular weight of the polymer may be measured by the method described in Examples below.

Specific examples of commercially available products of the uncrosslinked polymer (a1) include polyacrylic acids such as "ARON AC-10SL" (tradename) available from Toagosei Co., Ltd., etc.; acrylic-styrene-based resins such as "JONCRYL 67", "JONCRYL 611", "JONCRYL 678", "JONCRYL 680", "JONCRYL 690" and "JONCRYL 819" (tradenames) all available from BASF Japan, Ltd., etc.; and the like.

<Crosslinking Agent>

The crosslinking agent used in the present invention preferably has a water solubility rate (mass ratio) of not more than 50%, more preferably not more than 40% and even more preferably not more than 35% from the viewpoint of efficiently conducting the crosslinking reaction. The "water solubility rate % (mass ratio)" as used herein means a rate (%) of dissolution of the crosslinking agent as measured by dissolving 10 parts by mass of the crosslinking agent in 90 parts by mass of water at room temperature (25° C.).

The crosslinking agent is preferably a compound containing two or more epoxy groups in a molecule thereof. In the case where the uncrosslinked polymer (a1) contains a carboxy group, an ester group or a hydroxy group which is produced by the crosslinking reaction using the compound containing two or more epoxy groups in a molecule thereof as the crosslinking agent is excellent in affinity to the organic solvent (B), so that it is possible to improve ejection stability, drying properties and rub fastness of the resulting water-based ink. From the same viewpoint as described above, the crosslinking agent is more preferably a compound containing a glycidyl ether group in a molecule thereof, and even more preferably a polyglycidyl ether compound of a polyhydric alcohol containing a hydrocarbon group having not less than 3 and not more than 8 carbon atoms.

The molecular weight of the crosslinking agent is preferably not less than 120, more preferably not less than 150 and even more preferably not less than 200, and is also preferably not more than 2,000, more preferably not more than 1,500 and even more preferably not more than 1,000, from the viewpoint of facilitating the crosslinking reaction as well as from the viewpoint of improving ejection stability, drying properties and rub fastness of the resulting water-based ink.

The epoxy equivalent of the crosslinking agent is preferably not less than 90, more preferably not less than 100 and even more preferably not less than 110, and is also preferably not more than 300, more preferably not more than 200 and even more preferably not more than 150.

The number of epoxy groups contained in the crosslinking agent is not less than 2 per a molecule thereof, and is also preferably not more than 6 per a molecule thereof, from the viewpoint of efficiently reacting the crosslinking agent with the uncrosslinked polymer to thereby improve ejection stability, drying properties and rub fastness of the resulting water-based ink. The number of epoxy groups contained in the crosslinking agent is also more preferably not more than 4 per a molecule thereof from the viewpoint of good availability in the market.

Specific examples of the crosslinking agent include polyglycidyl ethers such as polypropylene glycol diglycidyl ether (water solubility rate: 31%), glycerol polyglycidyl ether, polyglycerol polyglycidyl ether, trimethylolpropane polyglycidyl ether (water solubility rate: 27%), sorbitol polyglycidyl ether, pentaerythritol polyglycidyl ether (water-insoluble), resorcinol diglycidyl ether, neopentyl glycol diglycidyl ether, 1,6-hexanediol diglycidyl ether and hydrogenated bisphenol A-type diglycidyl ethers, and the like. Of these crosslinking agents, preferred is at least one compound selected from the group consisting of trimethylolpropane polyglycidyl ether, pentaerythritol polyglycidyl ether and 1,6-hexanediol diglycidyl ether.

The crosslinking degree of the polymer particles (A) is preferably not less than 10%, more preferably not less than 20% and even more preferably not less than 30%, and is also preferably not more than 60%, more preferably not more than 50% and even more preferably not more than 40%.

The crosslinking degree as used herein is an apparent crosslinking degree calculated from an acid value of the uncrosslinked polymer and an equivalent of a crosslinkable functional groups contained in the crosslinking agent. More specifically, the crosslinking degree is calculated according to the formula of [(mole equivalent number of crosslinkable functional groups of crosslinking agent)/(mole equivalent number of acid groups of uncrosslinked polymer)].

In the case where the acid value of the acid group-containing uncrosslinked polymer is not less than 100 mgKOH/g and not more than 320 mgKOH/g, the crosslinking degree of the polymer particles (A) is preferably not less than 10%, more preferably not less than 20% and even more preferably not less than 30%, and is also preferably not more than 60%, more preferably not more than 50% and even more preferably not more than 40%, from the viewpoint of improving ejection stability, drying properties and rub fastness of the resulting water-based ink.

The water dispersion of the polymer particles (A) used in the present invention is preferably produced by mixing a water dispersion of the uncrosslinked polymer (a1) and the crosslinking agent to subject the uncrosslinked polymer (a1) to crosslinking reaction with the crosslinking agent and thereby form a crosslinked polymer (A1).

In the present invention, in the case where the uncrosslinked polymer (a1) is in the form of an acid group-containing uncrosslinked polymer, the acid groups of the uncrosslinked polymer are partially neutralized with the below-mentioned neutralizing agent, and further the acid groups of the uncrosslinked polymer are partially crosslinked with the crosslinking agent to form a crosslinked structure in the polymer, so that it is possible to use the polymer as the water dispersion of the polymer particles (A).

From the viewpoint of completing the crosslinking reaction and attaining good cost efficiency, the temperature used in the crosslinking treatment is preferably not lower than 40° C., more preferably not lower than 50° C., even more preferably not lower than 60° C. and further even more preferably not lower than 70° C., and is also preferably not higher than 95° C. and more preferably not higher than 90° C.

In addition, from the same viewpoint as described above, the time of the crosslinking treatment is preferably not less than 0.5 hour, more preferably not less than 1 hour, even more preferably not less than 1.5 hours and further even more preferably not less than 3 hours, and is also preferably not more than 12 hours, more preferably not more than 10 hours, even more preferably not more than 8 hours and further even more preferably not more than 6 hours.

The average particle size of the polymer particles (A) in the water dispersion is preferably not less than 5 nm, more preferably not less than 10 nm and even more preferably not less than 15 nm, and is also preferably not more than 200 nm, more preferably not more than 100 nm, even more preferably not more than 90 nm and further even more preferably not more than 80 nm, from the viewpoints of suppressing formation of coarse particles and improving ejection stability of the resulting water-based ink.

Meanwhile, the average particle size of the polymer particles (A) may be measured by the method described in Examples below.

In addition, it is preferred that the polymer particles (A) hardly suffer from swelling, contraction or flocculation therebetween, and it is also preferred that the average particle size of the polymer particles (A) in the resulting water-based ink is the same as the average particle size of the polymer particles (A) in the water dispersion. The preferred range of the average particle size of the polymer particles (A) in the resulting water-based ink is also the same as the preferred range of the average particle size of the polymer particles (A) in the water dispersion.

<Organic Solvent (B)>

The rate of change in viscosity of the organic solvent (B) as calculated according to the following formula (1) is not more than 140% from the viewpoint of improving ejection stability, drying properties and rub fastness of the resulting water-based ink.

$$\text{Rate of change in viscosity (\%)} = (\eta_B/\eta_{50}) \times 100 \qquad (1)$$

wherein $\eta_B$ is a viscosity of the organic solvent (B) as measured at 32° C.; and $\eta_{50}$ is a viscosity of a 50% by mass aqueous solution of the organic solvent (B) as measured at 32° C.

Incidentally, $\eta_B$ and $\eta_{50}$ may be measured by the method described in Examples below. In addition, in the case where two or more organic solvents are used in combination as the organic solvent (B), in the aforementioned formula (1), $\eta_B$ means a viscosity of a mixture of the two or more organic solvents as measured at 32° C.; and $\eta_{50}$ means a viscosity of a 50% by mass aqueous solution of the mixture of the two or more organic solvents as measured at 32° C.

The rate of change in viscosity of the organic solvent (B) is preferably not more than 135%, more preferably not more than 130%, even more preferably not more than 125%, further even more preferably not more than 120% and still further even more preferably not more than 115% from the viewpoint of improving ejection stability, drying properties and rub fastness of the resulting water-based ink. The lower limit of the rate of change in viscosity of the organic solvent (B) is preferably not less than 5% from the viewpoint of improving ejection stability of the resulting water-based ink.

The organic solvent (B) preferably contains one or more organic solvents having a boiling point of not lower than 90° C., and it is more preferred that the boiling points of all of the organic solvents contained in the organic solvent (B) are higher than 100° C. The weighted mean value of the boiling point of the organic solvent (B) is preferably not lower than 150° C. and more preferably not lower than 180° C., and is also preferably not higher than 250° C., more preferably not higher than 240° C., even more preferably not higher than 220° C. and further even more preferably not higher than 200° C.

The purity of the organic solvent (B) is preferably not less than 95% by mass and more preferably not less than 98% by mass.

In the present invention, the organic solvent (B) contains a polyhydric alcohol ether from the viewpoint of improving ejection stability, drying properties and rub fastness of the resulting water-based ink. The organic solvent (B) may further contain other organic solvents in addition to the polyhydric alcohol ether. Examples of the other organic solvents include a polyhydric alcohol, a nitrogen-containing heterocyclic compound, an amide, an amine, a sulfur-containing compound and the like.

The content of the polyhydric alcohol ether in the organic solvent (B) is preferably not less than 50% by mass, more preferably not less than 60% by mass, even more preferably not less than 70% by mass, further even more preferably not less than 75% by mass, still further even more preferably not less than 80% by mass and furthermore preferably not less than 90% by mass, and is also preferably not more than 100% by mass.

From the viewpoint of improving ejection stability, drying properties and rub fastness of the resulting water-based ink, the polyhydric alcohol ether is preferably a polyalkylene glycol monoalkyl ether. The number of carbon atoms in an alkyl group of the polyalkylene glycol monoalkyl ether is preferably not less than 1, and is also preferably not more than 4, more preferably not more than 3 and even more preferably not more than 2. The alkyl group of the polyalkylene glycol monoalkyl ether may be either linear or branched. As the polyalkylene glycol monoalkyl ether, from the viewpoint of improving ejection stability, drying properties and rub fastness of the resulting water-based ink, preferred is at least one compound selected from the group consisting of a dialkylene glycol monoalkyl ether and a trialkylene glycol monoalkyl ether, and more preferred is a dialkylene glycol monoalkyl ether. In addition, as the polyalkylene glycol monoalkyl ether, preferred is at least one compound selected from the group consisting of a polyethylene glycol monoalkyl ether and a polypropylene glycol monoalkyl ether, and more preferred is a polyethylene glycol monoalkyl ether.

The polyhydric alcohol ether is preferably at least one compound selected from the group consisting of a diethylene glycol monoalkyl ether, a dipropylene glycol monoalkyl ether and a triethylene glycol monoalkyl ether, more preferably at least one compound selected from the group consisting of a diethylene glycol monoalkyl ether and a dipropylene glycol monoalkyl ether, and even more preferably a diethylene glycol monoalkyl ether.

More specifically, as the polyhydric alcohol ether, preferred is at least one compound selected from the group consisting of diethylene glycol monomethyl ether, diethylene glycol monoethyl ether, diethylene glycol monoisopropyl ether, diethylene glycol monobutyl ether, diethylene glycol monoisobutyl ether, dipropylene glycol monomethyl ether and triethylene glycol monobutyl ether; more preferred is at least one compound selected from the group consisting of diethylene glycol monomethyl ether, diethylene glycol monoethyl ether, diethylene glycol monoisopropyl ether, diethylene glycol monobutyl ether, diethylene glycol monoisobutyl ether and dipropylene glycol monomethyl ether; and even more preferred is at least one compound selected from the group consisting of diethylene glycol monomethyl ether, diethylene glycol monoethyl ether and diethylene glycol monoisopropyl ether.

As the organic solvent (B), from the viewpoint of improving ejection stability and drying properties of the resulting water-based ink, the polyhydric alcohol ether may be used in combination with the polyhydric alcohol. Examples of the polyhydric alcohol include dihydric alcohols such as ethylene glycol, diethylene glycol, propylene glycol, etc., and trihydric alcohols such as glycerin, etc. Among these polyhydric alcohols, from the viewpoint of improving ejection stability and drying properties of the resulting water-based ink, preferred are dihydric alcohols.

<Pigment>

The hue of the water-based ink of the present invention is not particularly limited, and there may be used any of transparent inks containing no pigment; chromatic color inks having a yellow color, a magenta color, a cyan color, a red color, a blue color, an orange color, a green color, etc.; and achromatic color inks having a black color, etc. The water-based ink of the present invention may further contain a pigment, since the resulting water-based ink is excellent in ejection stability, drying properties and rub fastness.

The pigment may be either an inorganic pigment or an organic pigment. In addition, the inorganic or organic pigment may also be used in combination with an extender pigment, if required.

Examples of the inorganic pigment include carbon blacks, metal oxides, metal sulfides, metal chlorides and the like. Of these inorganic pigments, in particular, carbon blacks are preferably used for black inks. Examples of the carbon blacks include furnace blacks, thermal lamp blacks, acetylene blacks, channel blacks and the like. In addition, examples of the pigments used in white inks include metal oxides such as titanium oxide, zinc oxide, silica, alumina and magnesium oxide, and the like. Among these pigments for the white inks, preferred is titanium oxide.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments, quinophthalone pigments and the like. The hue of the organic pigment is not particularly limited, and there may be used any chromatic color pigment having a yellow color, a magenta color, a cyan color, a blue color, a red color, an orange color, a green color, etc. Specific examples of the preferred chromatic color pigments include one or more pigments selected from the group consisting of commercially available products marketed under the names of C.I. Pigment Yellow, C.I. Pigment Red, C.I. Pigment Orange, C.I. Pigment Violet, C.I. Pigment Blue and C.I. Pigment Green with various product numbers.

The aforementioned pigments may be used alone or in the form of a mixture of any two or more thereof.

The pigments used in the present invention is preferably used in the form of a water-based pigment dispersion prepared by dispersing the pigment in an aqueous medium. The pigment may be used in at least one configuration selected from the group consisting of a self-dispersible pigment, and particles formed by dispersing the pigment with a polymer dispersant. The polymer dispersant may be used for dispersing the pigment in the aqueous medium.

[Self-Dispersible Pigment]

The self-dispersible pigment means a pigment onto a surface of which at least one hydrophilic functional group (including an anionic hydrophilic group such as a carboxy group, etc., or a cationic hydrophilic group such as a quaternary ammonium group, etc.) is bonded either directly or through the other atom group such as an alkanediyl group having not less than 1 and not more than 12 carbon atoms to thereby render the pigment dispersible in an aqueous medium without using a surfactant or a resin.

Specific examples of commercially available products of the self-dispersible pigment include "CAB-O-JET" series products available from Cabot Japan K.K., and the like. The self-dispersible pigment is preferably used in the form of a water-based pigment dispersion prepared by dispersing the pigment in an aqueous medium.

[Particles Formed by Dispersing Pigment with Polymer Dispersant]

Examples of the particles formed by dispersing the pigment with the polymer dispersant (hereinafter also referred to merely as "pigment-dispersed polymer particles") include 1) particles formed by kneading the pigment and the polymer dispersant and then dispersing the resulting kneaded material in a medium such as water, etc.; 2) particles formed by stirring the pigment and the polymer dispersant in a medium such as water, etc., to disperse the pigment in the medium such as water, etc.; 3) particles formed by mechanically dispersing a polymer dispersant raw material and the pigment to polymerize the polymer dispersant raw material and then dispersing the pigment in a medium such as water, etc., with the resulting polymer dispersant; and the like.

In addition, from the viewpoint of improving ejection stability and storage stability of the resulting water-based ink, a crosslinking agent may be added to the particles formed by dispersing the pigment with the polymer dispersant to subject the polymer dispersant to crosslinking reaction.

Examples of the configuration of the pigment and the polymer dispersant which are present in the water-based ink include the configuration in which the polymer dispersant is adsorbed onto the pigment, the configuration in which the pigment is incorporated in the polymer dispersant, and the like. Among these configurations, from the viewpoint of improving dispersion stability of the pigment, preferred is the configuration of polymer particles formed by incorporating the pigment in the polymer dispersant, and more preferred is the configuration of pigment-enclosing polymer particles in which the pigment is incorporated.

(Polymer Dispersant)

As the polymer dispersant, there may be mentioned at least one polymer selected from the group consisting of condensation-based polymers such as polyesters, polyurethanes, etc.; vinyl-based polymers; and the like. Among these polymers, from the viewpoint of improving dispersion stability of the pigment, preferred are vinyl-based polymers that are obtained by addition-polymerizing a vinyl monomer (such as a vinyl compound, a vinylidene compound and a vinylene compound). The polymer dispersant may be in the form of either an appropriately synthetized product or a commercially available product.

In the case where the polymer particles (A) is formed of the crosslinked polymer (A1) obtained by crosslinking the aforementioned uncrosslinked polymer (a1) with the crosslinking agent, the polymer dispersant and the uncrosslinked polymer (a1) may be identical to or different from each other. However, from the viewpoint of improving ejection stability, drying properties and rub fastness of the resulting water-based ink, the polymer dispersant and the uncrosslinked polymer (a1) are preferably identical to each other.

The weight-average molecular weight of the polymer dispersant is preferably not less than 3,000, more preferably not less than 5,000 and even more preferably not less than 10,000, and is also preferably not more than 100,000, more preferably not more than 50,000 and even more preferably not more than 30,000, from the viewpoint of improving dispersibility of the pigment.

Meanwhile, the weight-average molecular weight may be measured by the method described in Examples below.

Specific examples of commercially available products of the polymer dispersant include polyacrylic acids such as "ARON AC-10SL" available from Toagosei Co., Ltd., etc.; acrylic-styrene-based resins such as "JONCRYL 67", "JONCRYL 611", "JONCRYL 678", "JONCRYL 680", "JONCRYL 690" and "JONCRYL 819" all available from BASF Japan, Ltd., etc.; and the like.

[Production of Water-Based Pigment Dispersion]

The particles formed by dispersing the pigment with the polymer dispersant can be efficiently produced in the form of a water-based pigment dispersion (hereinafter also referred to merely as a "pigment dispersion") by the process including the following steps I and II.

Step I; subjecting a mixture containing the polymer dispersant, the organic solvent, the pigment and water (hereinafter also referred to merely as a "pigment mixture") to dispersion treatment to obtain a dispersion of pigment-dispersed polymer particles; and Step II; removing the organic solvent from the dispersion obtained in the step I to obtain the water-based pigment dispersion of the pigment-dispersed polymer particles.

(Step I)

In the step I, there is preferably used the method in which the polymer dispersant is first dissolved in the organic solvent, and then the pigment and water, if required together with a neutralizing agent, a surfactant and the like, are added and mixed in the resulting polymer dispersant solution to obtain a dispersion of an oil-in-water type. The order of addition of the respective components to the polymer dispersant solution is not particularly limited, and it is preferred that water, the neutralizing agent and the pigment are sequentially added thereto in this order.

The organic solvent used for dissolving the polymer dispersant is not particularly limited, and is preferably selected from aliphatic alcohols having not less than 1 and not more than 3 carbon atoms, ketones, ethers, esters and the like. Of these organic solvents, from the viewpoints of improving wettability to the pigment, dissolvability of the polymer dispersant therein and adsorption of the polymer dispersant onto the pigment, more preferred are ketones having not less than 4 and not more than 8 carbon atoms, even more preferred are methyl ethyl ketone and methyl isobutyl ketone, and further even more preferred is methyl ethyl ketone.

When the polymer dispersant is synthesized by a solution polymerization method, the solvent used in the solution polymerization method may be directly used as such in the step I.

(Neutralization)

In the case where the polymer dispersant contains acid groups, it is preferred that the acid groups are at least partially neutralized using a neutralizing agent. When neutralizing the acid groups of the polymer dispersant, the neutralization is preferably conducted such that the pH value of the resulting dispersion is not less than 7 and not more than 11.

As the neutralizing agent, there may be mentioned hydroxides of alkali metals, and basic compounds such as organic amines, etc. Of these neutralizing agents, from the viewpoint of improving storage stability, ejection stability and rub fastness of the resulting pigment dispersion and water-based ink, preferred are the hydroxides of alkali metals.

Examples of the hydroxides of alkali metals include lithium hydroxide, sodium hydroxide, potassium hydroxide and cesium hydroxide. Of these hydroxides of alkali metals, preferred are sodium hydroxide and potassium hydroxide. Examples of the organic amines include ammonia, dimethylaminoethanol, triethanolamine, etc. Also, the polymer dispersant containing the acid groups may be previously neutralized.

The neutralizing agent is preferably used in the form of an aqueous neutralizing agent solution from the viewpoint of sufficiently and uniformly accelerating the neutralization of the acid groups of the polymer dispersant.

The equivalent of the neutralizing agent used is preferably not less than 10 mol %, more preferably not less than 15 mol %, even more preferably not less than 20 mol % and further even more preferably not less than 25 mol %, and is also preferably not more than 60 mol %, more preferably not more than 55 mol %, even more preferably not more than 50 mol % and further even more preferably not more than 45 mol %, from the viewpoint of improving storage stability, ejection stability and rub fastness of the resulting water-based pigment dispersion and water-based ink.

Meanwhile, the equivalent of the neutralizing agent used may be calculated according to the following formula. When the equivalent of the neutralizing agent used is not more than 100 mol %, the equivalent of the neutralizing agent used has the same meaning as the degree of neutralization of the polymer dispersant to be neutralized. On the other hand, when the equivalent of the neutralizing agent used as calculated according to the following formula exceeds 100 mol %, it is meant that the neutralizing agent is present in an excessive amount relative to the acid groups of the polymer dispersant, and in such a case, the degree of neutralization of the polymer dispersant is regarded as being 100 mol %.

Equivalent (mol %) of neutralizing agent used=
[{mass (g) of neutralizing agent added/equivalent of neutralizing agent}/[{acid value of polymer dispersant (mgKOH/g)×mass (g) of polymer dispersant}/(56×1,000)]]×100.

(Dispersion Treatment)

In the step I, the pigment mixture is subjected to dispersion treatment to obtain a dispersion of the pigment-dispersed polymer particles. The dispersing method for obtaining the dispersion is not particularly limited. The pigment particles may be atomized into fine particles having a desired average particle size only by substantial dispersion treatment in which a shear stress is applied to the pigment particles. However, it is preferred that the pigment mixture is first subjected to preliminary dispersion treatment, and then further subjected to the substantial dispersion treatment by applying a shear stress thereto so as to control the average particle size of the obtained pigment particles to a desired value.

The temperature used in the step I, in particular, the temperature used in the preliminary dispersion treatment in the step I, is preferably not lower than 0° C., and is also preferably not higher than 40° C., more preferably not higher than 30° C. and even more preferably not higher than 25° C. The dispersing time is preferably not less than 0.5 hour and more preferably not less than 0.8 hour, and is also preferably not more than 30 hours, more preferably not more than 10 hours and even more preferably not more than 5 hours.

When subjecting the pigment mixture to the preliminary dispersion treatment, there may be used ordinary mixing and stirring devices such as anchor blades, disper blades and the like. Of these devices, preferred are high-speed stirring mixers.

As a means for applying a shear stress to the pigment mixture in the substantial dispersion treatment, there may be used, for example, kneading machines such as roll mills, kneaders, etc., high-pressure homogenizers such as "MICROFLUIDIZER" available from Microfluidics Corporation, etc., and media-type dispersers such as paint shakers, beads mills, etc. Examples of the commercially available media-type dispersers include "Ultra Apex Mill" available from Kotobuki Industries Co., Ltd., "Pico Mill" available from Asada Iron Works Co., Ltd., and the like. These devices may be used in combination of any two or more thereof. Among these devices, the high-pressure homogenizers are preferably used from the viewpoint of reducing a particle size of the pigment.

In the case where the substantial dispersion treatment is conducted using the high-pressure homogenizer, the particle size of the pigment can be adjusted to a desired value by controlling the treating pressure and the number of passes through the homogenizer.

The treating pressure used in the substantial dispersion treatment is preferably not less than 60 MPa, more preferably not less than 100 MPa and even more preferably not less than 130 MPa, and is also preferably not more than 250 MPa, more preferably not more than 200 MPa and even more preferably not more than 180 MPa, from the viewpoint of enhancing productivity of the dispersion and cost efficiency.

Also, the number of passes through the homogenizer is preferably not less than 3 and more preferably not less than 10, and is also preferably not more than 30 and more preferably not more than 25.

(Step II)

In the step II, by removing the organic solvent from the dispersion obtained in the step I by any conventionally known methods, it is possible to obtain the water-based dispersion of the pigment-dispersed polymer particles (pigment dispersion). The organic solvent is preferably substantially completely removed from the thus obtained pigment dispersion. However, the residual organic solvent may be present in the pigment dispersion unless the objects and advantageous effects of the present invention are adversely affected by the residual organic solvent. The content of the residual organic solvent in the pigment dispersion is preferably not more than 0.1% by mass and more preferably not more than 0.01% by mass.

In addition, if required, the dispersion may be subjected to heating and stirring treatments before removing the organic solvent therefrom by distillation.

In the thus-obtained pigment dispersion, the pigment-dispersed polymer particles are dispersed in an aqueous medium containing water as a main medium.

The concentration of non-volatile components in the resulting pigment dispersion (solid content of the pigment dispersion) is preferably not less than 10% by mass and more preferably not less than 15% by mass, and is also preferably not more than 30% by mass and more preferably not more than 25% by mass, from the viewpoint of improving dispersion stability of the pigment dispersion as well as from the viewpoint of facilitating preparation of the water-based ink.

Meanwhile, the solid content of the pigment dispersion may be measured by the method described in Examples below.

The content of the pigment in the resulting pigment dispersion is preferably not less than 3% by mass, more preferably not less than 5% by mass and even more preferably not less than 10% by mass, and is also preferably not more than 30% by mass, more preferably not more than 25% by mass and even more preferably not more than 20% by mass, from the viewpoint of improving dispersion stability of the pigment dispersion as well as from the viewpoint of facilitating preparation of the water-based ink.

The mass ratio of the pigment to the polymer dispersant [pigment/polymer dispersant] in the resulting pigment dispersion is preferably not less than 0.5, more preferably not less than 1 and even more preferably not less than 2, and is also preferably not more than 5, more preferably not more than 4 and even more preferably not more than 3.5, from the viewpoint of improving dispersion stability of the pigment dispersion.

The average particle size of the pigment-dispersed polymer particles in the pigment dispersion is preferably not less than 50 nm, more preferably not less than 60 nm, even more preferably not less than 80 nm, further even more preferably not less than 95 nm and still further even more preferably not less than 105 nm, and is also preferably not more than 200 nm, more preferably not more than 160 nm and even more preferably not more than 140 nm, from the viewpoint of suppressing formation of coarse particles as well as from the viewpoint of improving ejection stability of the resulting water-based ink.

Meanwhile, the average particle size of the pigment-dispersed polymer particles may be measured by the method described in Examples below.

In addition, it is preferred that the pigment-dispersed polymer particles hardly suffer from swelling, contraction or flocculation therebetween, and it is also preferred that the average particle size of the pigment-dispersed polymer particles in the resulting water-based ink is the same as the average particle size of the pigment-dispersed polymer particles in the pigment dispersion. The preferred range of the average particle size of the pigment-dispersed polymer particles in the resulting water-based ink is also the same as the preferred range of the average particle size of the pigment-dispersed polymer particles in the pigment dispersion.

The average particle size of the aforementioned polymer particles (A) is preferably smaller than the average particle size of the pigment-dispersed polymer particles, and the former average particle size is more preferably smaller by 10 nm or more, and even more preferably smaller by 20 nm or more, than the latter average particle size.

[Method for Producing Water-Based Ink]

The water-based ink of the present invention can be efficiently produced preferably by mixing the water dispersion containing the polymer particles (A) and the organic solvent (B), if required together with water, the pigment and various additives such as a surfactant, etc. The pigment is preferably mixed in the form of a dispersion prepared by dispersing the pigment in an aqueous medium. From the viewpoint of improving ejection stability, drying properties and rub fastness of the resulting water-based ink, the pigment is more preferably mixed in the form of a water-based pigment dispersion of the pigment-dispersed polymer particles. The method of mixing the aforementioned respective components is not particularly limited.

Examples of the surfactant include a nonionic surfactant, an anionic surfactant, an ampholytic surfactant, a silicone-based surfactant, a fluorine-based surfactant, etc. Among these surfactants, preferred is a nonionic surfactant.

Examples of the additives used in the method for producing the water-based ink include a humectant, a wetting agent, a penetrant, a viscosity controller, a defoaming agent, an antiseptic agent, a mildew-proof agent, a rust preventive and the like.

The contents of the respective components in the water-based ink of the present invention as well as properties of the ink are as follows. The content of the polymer particles (A) in the water-based ink is preferably not less than 0.5% by mass, more preferably not less than 1% by mass and even more preferably not less than 1.5% by mass from the viewpoint of improving drying properties and rub fastness of the resulting water-based ink, and is also preferably not more than 10% by mass, more preferably not more than 8% by mass, even more preferably not more than 6% by mass and further even more preferably not more than 3% by mass from the viewpoint of improving ejection stability of the resulting water-based ink.

The mass ratio of the pigment to the polymer particles (A) [pigment/polymer particles (A)] in the water-based ink is preferably not less than 0, more preferably not less than 0.5, even more preferably not less than 1 and further even more preferably not less than 1.5 from the viewpoint of improving drying properties and rub fastness of the resulting water-based ink, and is also preferably not more than 4, more preferably not more than 3 and even more preferably not more than 2.5 from the viewpoint of improving ejection stability of the resulting water-based ink.

The content of the organic solvent (B) in the water-based ink is preferably not less than 5% by mass, more preferably not less than 10% by mass and even more preferably not less than 15% by mass from the viewpoint of improving ejection stability and rub fastness of the resulting water-based ink, and is also preferably not more than 40% by mass, more preferably not more than 35% by mass, even more preferably not more than 30% by mass and further even more preferably not more than 25% by mass from the viewpoint of improving drying properties of the resulting water-based ink.

The content of the polyhydric alcohol ether in the water-based ink is preferably not less than 3% by mass, more preferably not less than 5% by mass and even more preferably not less than 10% by mass from the viewpoint of improving ejection stability and rub fastness of the resulting water-based ink, and is also preferably not more than 40% by mass, more preferably not more than 35% by mass, even more preferably not more than 30% by mass and further even more preferably not more than 25% by mass from the viewpoint of improving drying properties of the resulting water-based ink.

In the case where the organic solvent (B) in the water-based ink contains the polyhydric alcohol, the content of the polyhydric alcohol in the water-based ink is preferably not more than 10% by mass and more preferably not more than 5% by mass from the viewpoint of improving ejection stability, drying properties and rub fastness of the resulting water-based ink. In addition, the content of the trivalent or higher-valent polyhydric alcohol in the water-based ink is preferably not more than 5% by mass and more preferably not more than 2% by mass from the viewpoint of improving ejection stability, drying properties and rub fastness of the resulting water-based ink.

The mass ratio of the organic solvent (B) to the polymer particles (A) [organic solvent (B)/water-insoluble polymer particles (A)] in the water-based ink is preferably not less than 2, more preferably not less than 5 and even more preferably not less than 10 from the viewpoint of improving ejection stability of the resulting water-based ink, and is also preferably not more than 20, more preferably not more than 17 and even more preferably not more than 15 from the viewpoint of improving drying properties of the resulting water-based ink.

The content of water in the water-based ink is preferably not less than 40% by mass, more preferably not less than 50% by mass and even more preferably not less than 60% by mass, and is also preferably not more than 85% by mass, more preferably not more than 80% by mass, even more preferably not more than 75% by mass and further even more preferably not more than 70% by mass, from the viewpoint of improving ejection stability of the resulting water-based ink.

In the case where the water-based ink contains the pigment, the content of the pigment in the water-based ink is preferably not less than 1% by mass, more preferably not less than 2% by mass and even more preferably not less than 3% by mass from the viewpoint of enhancing optical density of the resulting water-based ink upon printing, and is also preferably not more than 15% by mass, more preferably not more than 10% by mass and even more preferably not more than 5% by mass from the viewpoint of improving ejection stability and storage stability of the resulting water-based ink.

In the case where the pigment is dispersed with the polymer dispersant, the mass ratio of the pigment to the polymer dispersant [pigment/polymer dispersant] in the water-based ink is preferably not less than 0.5, more preferably not less than 1 and even more preferably not less than 2, and is also preferably not more than 5, more preferably not more than 4 and even more preferably not more than 3.5.

(Properties of Water-Based Ink)

The viscosity of the water-based ink as measured at 32° C. is preferably not less than 2.0 mPa·s, more preferably not less than 3.0 mPa·s and even more preferably not less than 4.0 mPa·s, and is also preferably not more than 12 mPa·s, more preferably not more than 9.0 mPa·s and even more preferably not more than 7.0 mPa·s, from the viewpoint of improving storage stability of the resulting water-based ink.

The viscosity of the water-based ink as measured at 32° C. may be measured by the method described in Examples below.

The pH value of the water-based ink as measured at 25° C. is preferably not less than 7.0, more preferably not less than 7.2 and even more preferably not less than 7.5 from the viewpoint of improving storage stability of the resulting water-based ink, and is also preferably not more than 11.0, more preferably not more than 10.0 and even more preferably not more than 9.5 from the viewpoint of improving the resistance of members to the water-based ink and suppressing skin irritation.

The pH value of the water-based ink as measured at 25° C. may be measured by the method described in Examples below.

[Printing Method]

The printing method of the present invention is such a printing method in which characters or images are printed on a printing medium using the aforementioned water-based ink. The aforementioned water-based ink is capable of providing a printed material that is excellent in drying properties and rub fastness even when printed on a low-water absorbing printing medium, and therefore can be suitably used as a water-based ink for flexographic printing, for gravure printing or for ink-jet printing. The water-based ink is excellent in ejection stability even when used in an ink-jet printing method, and therefore preferably used as a water-based ink for ink-jet printing.

In the ink-jet printing method using the aforementioned water-based ink, any of a serial head printing method, a line head printing method and the like may be used. However, the ink-jet printing method is preferably carried out by using an ink-jet printing apparatus equipped with a print head of a line type. The print head of a line type is a print head of an elongated shape having a length almost identical to a width of the printing medium. In the ink-jet printing method using the print head of a line type, while keeping the print head stationery and moving the printing medium in a transporting direction thereof, ink droplets are ejected from openings of nozzles of the print head to the printing medium in association with the movement of the printing medium, whereby it is possible to allow the ink droplets to adhere onto the printing medium to print characters or images, etc., thereon.

Examples of the printing medium include low-water absorbing printing media such as an art paper, a coated paper, a resin film, etc.

Specific examples of commercially available products of the coated paper include a versatile glossy coated paper "OK Topcoat+" (basis weight: 104.7 g/m$^2$; water absorption as measured by contacting with water for 100 milliseconds (hereinafter also defined in the same way): 4.9 g/m$^2$) available from Oji Paper Co., Ltd., a multi-color foam glossy coated paper (basis weight: 104.7 g/m$^2$; water absorption: 5.2 g/m$^2$) available from Oji Paper Co., Ltd., "UPM Finesse Gloss" (basis weight: 115 g/m$^2$; water absorption: 3.1 g/m$^2$) available from UPM, "UPM Finesse Matt" (basis weight: 115 g/m$^2$; water absorption: 4.4 g/m$^2$) available from UPM, "TerraPress Silk" (basis weight: 80 g/m$^2$; water absorption: 4.1 g/m$^2$) available from Stora Enso, and the like.

Examples of the resin film include a polyester film, a polyvinyl chloride film, a polypropylene film, a polyethylene film, a nylon film, and the like. These resin films may be subjected to surface treatments such as corona treatment, etc., if required.

Examples of commercially available products of the resin films include "LUMIRROR (registered trademark) T60" (polyethylene terephthalate; water absorption: 2.3 g/m$^2$) available from Toray Industries Inc., "FE2001" (corona-treated polyethylene terephthalate; water absorption: 0 g/m$^2$) available from Futamura Chemical Co, Ltd., "PVC80B P" (polyvinyl chloride; water absorption: 1.4 g/m$^2$) available from Lintec Corporation, "KINATH KEE 70CA" (polyethylene) available from Lintec Corporation, "YUPO SG90 PAT1" (polypropylene) available from Lintec Corporation, "BONYL RX" (nylon) available from Kohjin Film & Chemicals Co., Ltd., and the like.

The printing method of the present invention is capable of providing a printed material that is excellent in ejection stability, drying properties and rub fastness. Therefore, in the printing method, it is preferable to use a printing medium whose water absorption per a unit surface area thereof as measured by contacting the printing medium with pure water for 100 milliseconds is not less than 0 g/m$^2$ and not more than 10 g/m$^2$.

The water absorption of the printing medium used in the present invention per a unit surface area thereof as measured by contacting the printing medium with pure water for 100 milliseconds is preferably not less than 0 g/m$^2$ and not more than 6 g/m$^2$, more preferably not less than 0 g/m$^2$ and not more than 4.5 g/m$^2$, and even more preferably not less than 0 g/m$^2$ and not more than 2.5 g/m$^2$.

In addition, in the printing method of the present invention, a water-absorbing printing medium such as a plain paper, a wood-free paper, etc., may also be used as the printing medium.

EXAMPLES

In the following Preparation Examples, Production Examples, Examples and Comparative Examples, the "part(s)" and "%" indicate "part(s) by mass" and "% by mass", respectively, unless otherwise specified.

(1) Measurement of Acid Value of Uncrosslinked Polymer

One gram of an uncrosslinked polymer was mixed with 50 g of ion-exchanged water, and then with 6 mL of a 0.1 N sodium hydroxide solution. A 0.1 N hydrochloric acid was gradually added dropwise to the resulting solution to measure two inflection points of the pH value thereof in the titration curve observed. The number of moles of the acid calculated from the difference between amounts (titers) of the 0.1 N hydrochloric acid added dropwise as measured at the two inflection points corresponds to the number of moles of acid groups of the uncrosslinked polymer. The thus determined number of moles of the acid groups of the uncrosslinked polymer is converted into an acid value thereof.

(2) Measurement of Weight-Average Molecular Weight of Polymer

The weight-average molecular weight of the polymer was measured by gel permeation chromatography [GPC apparatus: "HLC-8120GPC" available from Tosoh Corporation; columns: "TSK-GEL, α-M"×2 available from Tosoh Corporation; flow rate: 1 mL/min] using a solution prepared by dissolving phosphoric acid (guaranteed reagent) available from Wako Pure Chemical Industries, Ltd., and lithium bromide (reagent) available from Tokyo Chemical Industry Co., Ltd., in N,N-dimethylformamide (for high-performance liquid chromatography) available from Wako Pure Chemical Industries, Ltd., such that concentrations of phosphoric acid and lithium bromide in the resulting solution were 60 mmol/L and 50 mmol/L, respectively, as an eluent, and using monodisperse polystyrenes having previously known molecular weights as a reference standard substance.

(3) Measurement of Average Particle Sizes of Water-Insoluble Polymer Particles (A) and Pigment-Dispersed Polymer Particles The particles were subjected to cumulant analysis using a laser particle analyzing system "ELS-8000" available from Otsuka Electrics Co., Ltd., to measure an average particle size thereof. The above measurement was conducted under the conditions including a temperature of 25° C., an angle between incident light and detector of 90° and a cumulative number of 100 times, and a refractive index of water (1.333) was input to the analyzing system as a refractive index of the dispersing medium. The measurement was also conducted by adjusting a concentration of the dispersion to be measured to 5×10$^{-3}$% in terms of a solid content thereof. The thus measured cumulant average particle sizes were defined as respective average particle sizes of the water-insoluble polymer particles (A) and the pigment-dispersed polymer particles.

(4) Measurement of $\eta_B$ and $\eta_{50}$ (Measurement of $\eta_B$)

The viscosity of the organic solvent (B) used was measured at 32° C. using an E-type viscometer "TV-25" (equipped with a standard cone rotor (1°34'×R24); rotating speed: 50 rpm) available from Toki Sangyo Co., Ltd. In the case where two or more organic solvents were used as the organic solvent (B), the viscosity of a mixture containing the two or more organic solvents at the predetermined mixing ratio was measured.

(Measurement of $\eta_{50}$)

The viscosity of a 50% dilute aqueous solution of the organic solvent (B) prepared by diluting the organic solvent (B) used with ion-exchanged water was measured at 32° C. using the same E-type viscometer as used above for the measurement of $\eta_B$. In the case where two or more organic solvents were used as the organic solvent (B), the viscosity of a 50% dilute aqueous solution of a mixture containing these organic solvents at the predetermined mixing ratio which was prepared by diluting the mixture with ion-exchanged water was measured.

(5) Measurement of Solid Content

Sodium sulfate dried to constant weight in a desiccator was weighed in an amount of 10.0 g and charged into a 30 mL polypropylene container (φ: 40 mm; height: 30 mm), and about 1.0 g of a sample to be measured was added to the container. The contents of the container were mixed with each other and then accurately weighed. The resulting mixture was maintained in the container at 105° C. for 2 hours to remove volatile components therefrom, and further allowed to stand in a desiccator for 15 minutes to measure a mass thereof. The mass of the sample after removing the volatile components therefrom was regarded as a mass of solids therein. The solid content of the sample was calculated by dividing the mass of the solids by the mass of the sample initially added.

(6) Measurement of Viscosity of Water-Based Ink

The viscosity of the water-based ink was measured at 32° C. using an E-type viscometer "TV-25" (equipped with a standard cone rotor (1°34'×R24); rotating speed: 50 rpm) available from Toki Sangyo Co., Ltd.

(7) Measurement of pH of Water-Based Ink

The pH value of the water-based ink was measured at 25° C. using a bench-top pH meter "F-71" available from Horiba Ltd., equipped with a pH electrode "6337-10D" available from Horiba Ltd.

(8) Water Absorption of Printing Medium per Unit Surface Area Thereof as Measured by Contacting Printing Medium with Pure Water for 100 Milliseconds Using an automatic scanning absorptometer "KM500win" available from Kumagai Riki Kogyo Co., Ltd., the amount of pure water transferred to a printing medium when contacting the printing medium with pure water for 100 milliseconds was measured at 23° C. under a relative humidity of 50%. The thus determined amount of pure water transferred to the printing medium was defined as a water absorption of the printing medium as measured in a pure water contact time of 100 milliseconds. The measuring conditions are shown below.

"Spiral Method"
Contact time: 0.010 to 1.0 (sec)
Pitch (mm): 7
Length Per Sampling (degree): 86.29
Start Radius (mm): 20 End Radius (mm): 60
Min Contact Time (ms): 10 Max Contact Time (ms): 1000
Sampling Pattern (1-50): 50
Number of Sampling Points (>0): 19
"Square Head"
Split Span (mm): 1 Split Width (mm): 5

Preparation Example 1

Preparation of Water-Based Pigment Dispersion

Twenty five parts of an acrylic acid-styrene-based resin "JONCRYL 690" (weight-average molecular weight:

16,500; acid value: 240 mgKOH/g) available from BASF Japan, Ltd., were mixed with 78.6 parts of methyl ethyl ketone. Then, 6.3 parts of a 5 N sodium hydroxide aqueous solution (sodium hydroxide solid content: 16.9%; for volumetric titration) available from Wako Pure Chemical Industries, Ltd., were further added to the resulting mixed solution to neutralize the polymer such that the ratio of the number of moles of sodium hydroxide to the number of moles of carboxy groups of the polymer was 40% (neutralization degree: 40 mol %). Furthermore, 100 parts of ion-exchanged water and then 100 parts of a cyan pigment "TGR-SD" (tradename; C.I. Pigment Blue 15:3) available from DIC Corporation were added to the resulting reaction solution. The thus obtained dispersion was stirred at 20° C. for 60 minutes using a disper "ULTRA DISPER" (tradename) available from Asada Iron Works Co., Ltd., while operating a disper blade thereof at a rotating speed of 7,000 rpm.

The resulting mixture was subjected to dispersion treatment under a pressure of 200 MPa using a "Microfluidizer" (tradename) available from Microfluidics Corporation by passing the mixture through the device 10 times. The obtained dispersion was mixed with 250 parts of ion-exchanged water and stirred together, and then allowed to stand at 60° C. under reduced pressure to remove MEK therefrom, followed by further removing a part of water therefrom. The resulting dispersion was subjected to filtration treatment using a 25 mL-capacity needleless syringe available from Terumo Corporation fitted with a 5 μm-mesh filter (acetyl cellulose membrane; outer diameter: 2.5 cm) available from FUJIFILM Corporation to remove coarse particles therefrom, thereby obtaining a water-based pigment dispersion 1 having a solid content of 20% (in which pigment content: 75%; polymer content: 25%) (average particle size: 108 nm).

Production Example 1

Production of Water Dispersion of Uncrosslinked Polymer (a1-1) Particles

Twenty five parts of an acrylic acid-styrene-based resin "JONCRYL 690" were mixed with 100 parts of ion-exchanged water, and then 6.3 parts of a 5 N sodium hydroxide aqueous solution (sodium hydroxide solid content: 16.9%; for volumetric titration) available from Wako Pure Chemical Industries, Ltd., were further added to the resulting mixed solution to neutralize the polymer such that the ratio of the number of moles of sodium hydroxide to the number of moles of carboxy groups of the polymer was 40%. The thus obtained reaction solution was stirred at 90° C. for 3 hours using a magnetic stirrer and self-emulsified, thereby obtaining a water dispersion of uncrosslinked polymer (a1-1) particles having a solid content of 20% (average particle size: 20 nm).

Production Example 2

Production of Water Dispersion of Polymer Particles (A1-1)

A screw-neck glass bottle was charged with 100 parts of the water dispersion of the uncrosslinked polymer (a1-1) particles (solid content: 20%) obtained in Production Example 1, and then with 4.41 parts of trimethylolpropane polyglycidyl ether "DENACOL EX-321L" (epoxy equivalent: 129) as a crosslinking agent available from Nagase ChemteX Corporation and 17.6 parts of ion-exchanged water, and hermetically sealed with a cap. The contents of the glass bottle were heated at 80° C. for 5 hours while stirring with a stirrer. After the elapse of 5 hours, the contents of the glass bottle were cooled to room temperature, and then subjected to filtration treatment using a 25 mL-capacity needleless syringe available from Terumo Corporation fitted with a 5 μm-mesh filter (acetyl cellulose membrane; outer diameter: 2.5 cm) available from FUJIFILM Corporation, thereby obtaining a water dispersion of polymer particles (A1-1) having a solid content of 20% (average particle size: 65 nm).

Comparative Production Example 1

Production of Water Dispersion of Polymer Particles (AC-1)

A 1000 mL-capacity separable flask was charged with 145 parts of methyl methacrylate available from Wako Pure Chemical Industries, Ltd., 50 parts of 2-ethylhexyl acrylate available from Wako Pure Chemical Industries, Ltd., 5 parts of methacrylic acid available from Wako Pure Chemical Industries, Ltd., 18.5 parts of "LATEMUL E118B" (tradename; emulsifier; active ingredient content: 26%) available from Kao Corporation, 96 parts of ion-exchanged water and potassium persulfate available from Wako Pure Chemical Industries, Ltd., and the contents of the flask were stirred using a stirring blade (300 rpm), thereby obtaining a monomer emulsion.

A reaction vessel was charged with 4.6 parts of "LATEMUL E118B", 186 parts of ion-exchanged water and 0.08 part of potassium persulfate, and an inside atmosphere of the reaction vessel was fully replaced with nitrogen gas. In a nitrogen atmosphere, the contents of the reaction vessel were heated to 80° C. while stirring with a stirring blade (200 rpm), and then the aforementioned monomer emulsion was charged into a dropping funnel and added dropwise into the reaction vessel over 3 hours to react the monomer emulsion with the contents of the reaction vessel, thereby obtaining a water dispersion of polymer particles (AC-1) having a solid content of 42% (average particle size: 100 nm).

Example 1

Ten parts of the water dispersion of the polymer particles (A1-1) obtained in Production Example 2 (solid content: 20%; polymer particles (A1-1): 2 parts), 25 parts of diethylene glycol monomethyl ether available from Wako Pure Chemical Industries, Ltd., 27.5 parts of the water-based pigment dispersion 1 (solid content: 20%) obtained in Preparation Example 1, and 0.5 part of a silicone-based surfactant "KF-642" (tradename; polyether-modified silicone) available from Shin-Etsu Chemical Co., Ltd., were mixed with each other, and the resulting mixture was further mixed with ion-exchanged water so as to adjust a total amount of the mixture to 100 parts, thereby obtaining a water-based ink 1.

Examples 2 to 12 and Comparative Examples 1 to 8

The same procedure as in Example 1 was repeated except that the formulation of the respective components were changed to those shown in Tables 1 and 2, thereby obtaining water-based inks 2 to 12 of Examples 2 to 12 and water-based inks C1 to C8 of Comparative Examples 1 to 8.

The viscosity of each of the water-based inks 1 to 12 as measured at 32° C. was about 4.5 mPa·s, and the pH value thereof as measured at 25° C. was in the range of 7.5 to 9.5.

Meanwhile, the amounts of the water-insoluble polymer particles (A) and the water-based pigment dispersions as shown in Tables 1 and 2 are indicated by amounts of active ingredients contained therein. In addition, the respective notations in Tables 1 and 2 are as follows.

[Organic Solvent (B)]

MDG: Diethylene glycol monomethyl ether (boiling point (b.p.): 194° C.)

EDG: Diethylene glycol monoethyl ether (b.p.: 202° C.)

iPDG: Diethylene glycol monoisopropyl ether (b.p.: 207° C.)

BDG: Diethylene glycol monobutyl ether (b.p.: 230° C.)

iBDG: Diethylene glycol monoisobutyl ether (b.p.: 230° C.)

BTG: Triethylene glycol monobutyl ether (b.p.: 276° C.)

MFDG: Dipropylene glycol monomethyl ether (b.p.: 190° C.)

PG: Propylene glycol (b.p.: 188° C.)

Gly: Glycerin (b.p.: 290° C.)

2P: 2-Pyrrolidone (b.p.: 245° C.)

IPA: Isopropanol (b.p.: 82° C.)

[Surfactant]

KF-642 (tradename): Silicone-based surfactant (polyether-modified silicone) available from Shin-Etsu Chemical Co., Ltd.

The water-based inks obtained in Examples 1 to 12 and Comparative Examples 1 to 8 were evaluated for ejection stability, drying properties and rub fastness thereof by the following methods. The results are shown in Tables 1 and 2.

(Preparation of Printed Material)

Under the environmental conditions of a temperature of 25±1° C. and a relative humidity of 30±5%, the respective water-based inks obtained in the aforementioned Examples and Comparative Examples were loaded into a print evaluation apparatus available from Trytech Co., Ltd., equipped with an ink-jet print head "KJ4B-HDO6MHG-STDV" (piezoelectric type) available from Kyocera Corporation.

The operating conditions of the print evaluation apparatus were set to an applied head voltage of 26 V, a frequency of 10 kHz, an ejected ink droplet amount of 5 pL, a head temperature of 32° C., a resolution of 600 dpi, the number of ink shots for flushing before being ejected of 200 shots and a negative pressure of −4.0 kPa.

A coated paper "OK Topcoat+" (tradename; water absorption: 4.9 g/m$^2$) as a low-water absorbing printing medium available from Oji Paper Co., Ltd., or a polyethylene terephthalate film "LUMIRROR (registered trademark) T60 #75" (water absorption: 2.3 g/m$^2$) as a non-water absorbing printing medium available from Toray Industries Inc., was fixed on a transportation table by vacuum such that the longitudinal direction of the printing medium was aligned with a transportation direction thereof. A printing command was transmitted to the aforementioned print evaluation apparatus to print a print pattern having a Duty 100% solid image portion of 2 cm square on the printing medium, thereby obtaining a printed material using the aforementioned low-water absorbing printing medium or non-water absorbing printing medium.

Test 1 (Ejection Stability)

After preparing a printed material, operation of a printer was once suspended for 60 minutes, and an ink-jet print head thereof was exposed to atmospheric air. After the elapse of 60 minutes from the suspending, the printing operation of the printer was started again to observe the condition of ejection of the ink upon preparation of the first sheet printed material. The ejection recovery rate (%) was calculated according to the following formula to evaluate ejection stability of the ink.

Ejection Recovery Rate (%)=[(Ink Ejection Area of Printed Solid Image after Exposure of Print Head to Atmospheric Air for 60 Minutes/Ink Ejection Area of Printed Solid Image before Test)]×100

It was recognized that as the ejection recovery rate (%) was increased, the ejection stability of the ink became more excellent. When the ejection recovery rate was not less than 70%, the ink could be used in the practical applications.

Test 2 (Evaluation of Drying Properties)

A printed surface of the printed material obtained in the aforementioned paragraph "Preparation of Printed Material" was rubbed with a cotton swab at room temperature (25° C.) after the elapse of x seconds from the time immediately after being printed. Concretely, 20 solid images each having a size of 2 cm square were printed on the printed surface of the printed material, and the surfaces of the different solid images were successively rubbed with respective cotton swabs at the intervals of 5 seconds until reaching 20 seconds as the elapsed time from the time immediately after being printed, and then at the intervals of 10 seconds after the elapse of 20 seconds or later. The elapsed time x (seconds) from the time immediately after being printed to the time at which any transfer of the ink from the printed surface to the cotton swab was no longer observed, was measured and used as an evaluation axis for evaluating drying properties of the ink. The values of the elapsed time x in the respective Examples and Comparative Examples are shown in Tables 1 and 2. It was recognized that as the elapsed time x was shortened, the drying properties of the ink became more excellent. When the value was less than 70 in numeral, the ink could be used in the practical applications.

Test 3 (Evaluation of Rub Fastness)

The printed material obtained in the aforementioned paragraph "Preparation of Printed Material" was subjected to a rub fastness test using "AB-201 Sutherland-type Ink Rub Tester" available from Tester Sangyo Co., Ltd. In the rub fastness test, the printed material was dried under the environmental condition of 60° C. for 10 minutes, and rubbed with a cellulose nonwoven fabric "BEMCOT M-3" as a friction material available from Asahi Kasei Corp., on which a weight having a bottom surface area of 50 cm$^2$ was rested to apply a load of 900 g thereto, 10 times (by 10 reciprocating motions). The rubbed printed material was visually observed to confirm the condition of the printed surface thereof and evaluate rub fastness of the ink according to the following evaluation ratings.

[Evaluation Ratings]

3: No flaws were visually observed on the surface of the printed material, and no change in condition of the printed surface between before and after the rubbing was recognized.

2: Some flaws were visually observed on the surface of the printed material, but no exposure of the surface of the underlying printing medium occurred, and therefore the ink was still usable in the practical applications.

1: Flaws were visually observed on the surface of the printed material, and the surface of the underlying printing medium was partially exposed, so that certain problems were posed on the ink when used in the practical applications.

0: The surface of the underlying printing medium was entirely exposed, and therefore significant problems were posed on the ink when used in the practical applications.

TABLE 1-1

|  |  |  | Examples |  |  |  |  |  |  |  |  |  |  |  |
|---|---|---|---|---|---|---|---|---|---|---|---|---|---|---|
|  |  |  | 1 | 2 | 3 | 4 | 5 | 6 | 7 | 8 | 9 | 10 | 11 | 12 |
| Ink composition (part(s)) | Ink No. |  | 1 | 2 | 3 | 4 | 5 | 6 | 7 | 8 | 9 | 10 | 11 | 12 |
|  | Polymer particles (A) | A1-1 | 2 | 2 | 2 | 2 | 2 | 2 | 2 | 2 | 2 | 2 | 5 | 7 |
|  |  | a1-1 |  |  |  |  |  |  |  |  |  |  |  |  |
|  |  | AC-1 |  |  |  |  |  |  |  |  |  |  |  |  |
|  | Organic solvent (B) | MDG | 25 |  |  |  |  |  |  |  | 11.5 | 30 | 20 | 20 |
|  |  | EDG |  | 22 |  |  |  |  |  |  |  |  |  |  |
|  |  | iPDG |  |  | 18 |  |  |  |  | 16.8 |  |  |  |  |
|  |  | BDG |  |  |  | 16 |  |  |  |  |  |  |  |  |
|  |  | iBDG |  |  |  |  | 15 |  |  |  | 11.5 |  |  |  |
|  |  | BTG |  |  |  |  |  | 10.5 |  |  |  |  |  |  |
|  |  | MFDG |  |  |  |  |  |  | 22 |  |  |  |  |  |
|  |  | PG |  |  |  |  |  |  |  | 4.2 |  |  |  |  |
|  |  | Gly |  |  |  |  |  |  |  |  |  |  |  |  |
|  |  | 2P |  |  |  |  |  |  |  |  |  |  |  |  |
|  |  | IPA |  |  |  |  |  |  |  |  |  |  |  |  |
|  | Water-based pigment dispersion | PB15:3 | 4.1 | 4.1 | 4.1 | 4.1 | 4.1 | 4.1 | 4.1 | 4.1 | 4.1 | 4.1 | 4.1 | 0 |
|  |  | Joncryl 690 | 1.4 | 1.4 | 1.4 | 1.4 | 1.4 | 1.4 | 1.4 | 1.4 | 1.4 | 1.4 | 1.4 | 0 |
|  | Surfactant | KF-642 | 0.5 | 0.5 | 0.5 | 0.5 | 0.5 | 0.5 | 0.5 | 0.5 | 0.5 | 0.5 | 0.5 | 0.5 |
|  | Ion-exchanged water |  | bal.* | bal.* | bal.* | bal.* | bal.* | bal.* | bal.* | bal.* | bal.* | bal.* | bal.* | bal.* |

Note
bal.*: Balance

TABLE 1-2

|  |  |  | Examples |  |  |  |  |  |  |  |  |  |  |  |
|---|---|---|---|---|---|---|---|---|---|---|---|---|---|---|
|  |  |  | 1 | 2 | 3 | 4 | 5 | 6 | 7 | 8 | 9 | 10 | 11 | 12 |
| Weighted mean value of boiling point of organic solvent (B) (° C.) |  |  | 194 | 202 | 207 | 230 | 230 | 276 | 190 | 203 | 212 | 194 | 194 | 194 |
| Rate of change in viscosity of organic solvent (B) (%) |  |  | 93 | 114 | 112 | 110 | 105 | 139 | 70 | 128 | 101 | 93 | 93 | 93 |
| Content of organic solvent (B) in ink (% by mass) |  |  | 25 | 22 | 18 | 16 | 15 | 10.5 | 22 | 21 | 23 | 30 | 20 | 20 |
| Mass ratio [organic solvent (B)/polymer particles (A)] |  |  | 12.5 | 11.0 | 9.0 | 8.0 | 7.5 | 5.3 | 11.0 | 10.5 | 11.5 | 15.0 | 4.0 | 2.9 |
| Evaluation | Ejection stability |  | 100 | 90 | 80 | 75 | 75 | 70 | 90 | 80 | 90 | 100 | 75 | 100 |
|  | Low-water absorbing printing medium | Drying properties | 5 | 10 | 5 | 10 | 10 | 15 | 5 | 20 | 5 | 10 | 5 | 5 |
|  |  | Rub fastness | 3 | 3 | 3 | 3 | 3 | 2 | 3 | 3 | 3 | 3 | 3 | 3 |
|  | Non-water absorbing printing medium | Drying properties | 50 | 40 | 30 | 40 | 30 | 60 | 60 | 60 | 40 | 60 | 30 | 20 |
|  |  | Rub fastness | 3 | 3 | 3 | 2 | 2 | 2 | 3 | 2 | 3 | 3 | 3 | 3 |

TABLE 2-1

|  |  |  | Comparative Examples |  |  |  |  |  |  |  |
|---|---|---|---|---|---|---|---|---|---|---|
|  |  |  | 1 | 2 | 3 | 4 | 5 | 6 | 7 | 8 |
| Ink composition (part(s)) | Ink No. |  | C1 | C2 | C3 | C4 | C5 | C6 | C7 | C8 |
|  | Polymer particles (A) | A1-1 | 2 | 2 |  |  |  |  |  | 2 |
|  |  | a1-1 |  |  |  | 2 |  |  |  |  |
|  |  | AC-1 |  |  | 2 |  |  | 2 | 2 |  |
|  | Organic solvent (B) | MDG |  |  | 25 | 25 | 25 |  |  |  |
|  |  | EDG |  |  |  |  |  |  |  |  |
|  |  | iPDG |  | 13 |  |  |  | 30 | 25 |  |
|  |  | BDG |  |  |  |  |  |  |  |  |
|  |  | iBDG |  |  |  |  |  |  |  |  |
|  |  | BTG |  |  |  |  |  |  |  |  |
|  |  | MFDG |  |  |  |  |  |  |  |  |

TABLE 2-1-continued

|  |  | Comparative Examples | | | | | | | |
|---|---|---|---|---|---|---|---|---|---|
|  |  | 1 | 2 | 3 | 4 | 5 | 6 | 7 | 8 |
|  | PG | 22 | 13 |  |  |  |  | 1 |  |
|  | Gly |  |  |  |  |  |  |  | 3.7 |
|  | 2P |  |  |  |  |  |  |  | 5 |
|  | IPA |  |  |  |  |  |  |  | 2 |
| Water-based pigment dispersion | PB15:3 | 4.1 | 4.1 | 4.1 | 4.1 | 4.1 | 4.1 | 4.1 | 4.1 |
|  | Joncryl 690 | 1.4 | 1.4 | 1.4 | 1.4 | 1.4 | 1.4 | 1.4 | 1.4 |
| Surfactant | KF-642 | 0.5 | 0.5 | 0.5 | 0.5 | 0.5 | 0.5 | 0.5 | 0.5 |
|  | Ion-exchanged water | bal.* | bal.* | bal.* | bal.* | bal.* | bal.* | bal.* | bal.* |

Note
bal.*: Balance

TABLE 2-2

|  |  |  | Comparative Examples | | | | | | | |
|---|---|---|---|---|---|---|---|---|---|---|
|  |  |  | 1 | 2 | 3 | 4 | 5 | 6 | 7 | 8 |
| Weighted mean value of boiling point of organic solvent (B) (° C.) | | | 188 | 198 | 194 | 194 | 194 | 207 | 206 | 230 |
| Rate of change in viscosity of organic solvent (B) (%) | | | 667 | 238 | 93 | 93 | 93 | 112 | 119 | 629 |
| Content of organic solvent (B) in ink (% by mass) | | | 22 | 26 | 25 | 25 | 25 | 30 | 26 | 10.7 |
| Mass ratio [organic solvent (B)/ polymer particles (A)] | | | 11.0 | 13.0 | 12.5 | 12.5 | — | 15.0 | 13.0 | 5.4 |
| Evaluation | Ejection stability | | 40 | 60 | 20 | 0 | 100 | 20 | 20 | 0 |
|  | Low-water absorbing printing medium | Drying properties | 40 | 20 | 30 | 30 | — | 10 | 15 | 180 (*1) |
|  |  | Rub fastness | 2 | 2 | 1 | 3 | 0 | 1 | 1 | 0 |
|  | Non-water absorbing printing medium | Drying properties | 120 | 80 | 90 | 70 | — | 70 | 50 | 180 (*1) |
|  |  | Rub fastness | 2 | 3 | 1 | 2 | 0 | 1 | 1 | 0 |

Note
(*1) In the test concerning drying properties conducted in Comparative Example 8, transfer of the ink to a cotton swab was recognized even after the elapse of 180 seconds.

From Tables 1 and 2, it was confirmed that the water-based inks obtained in the respective Examples were excellent in ejection stability (ejection restorability), drying properties and rub fastness as compared to the water-based inks obtained in the respective Comparative Examples.

On the other hand, in the water-based inks obtained in Comparative Examples 1, 2 and 8, the rate of change in viscosity of the organic solvent (B) contained therein was more than 140%, and therefore these water-based inks were deteriorated in ejection stability, drying properties and rub fastness as compared to the water-based inks obtained in Examples 1 to 12.

In the water-based inks obtained in Comparative Examples 3, 4, 6 and 7, the polymer particles (AC-1) or the polymer particles (a1-1) contained therein had no crosslinking structure, and therefore these water-based inks were deteriorated in ejection stability, drying properties and rub fastness as compared to the water-based inks obtained in Examples 1 to 12.

The water-based ink obtained in Comparative Example 5 contained no polymer particles (A), and therefore was incapable of exhibiting the effect of improving rub fastness.

INDUSTRIAL APPLICABILITY

The water-based ink of the present invention is excellent in ejection stability, and is capable of achieving excellent drying properties and rub fastness when printed on a low-water absorbing printing medium.

The invention claimed is:

1. A water-based ink comprising water-insoluble polymer particles (A), an organic solvent (B) and water, in which:
    a polymer constituting the water-insoluble polymer particles (A) is in the form of a crosslinked polymer;
    the water-insoluble polymer particles (A) are in the form of pigment-free polymer particles;
    further comprising a pigment;
    the pigment is present in the water-based ink in the form of particles formed by dispersing the pigment with a polymer dispersant;
    an average particle size of the water-insoluble polymer particles (A) is not less than 5 nm and not more than 90 nm, and an average particle size of the particles formed by dispersing the pigment with the polymer dispersant is not less than 95 nm and not more than 200 nm;
    the organic solvent (B) comprises a polyhydric alcohol ether; and
    a rate of change in viscosity of the organic solvent (B) as calculated according to the following formula (1) is not more than 140%, $$\text{Rate of change in viscosity (\%)} = (\eta_B/\eta_{50}) \times 100 \quad (1)$$

wherein $\eta_B$ is a viscosity of the organic solvent (B) as measured at 32° C.; and $\eta_{50}$ is a viscosity of a 50% by mass aqueous solution of the organic solvent (B) as measured at 32° C., and wherein a content of the organic solvent (B) in the water-based ink is not less than 18% by mass and not more than 35% by mass, a content of the polyhydric alcohol ether in the organic solvent (B) is not less than 60% by mass, wherein the polyhydric alcohol ether is at least one compound selected from the group consisting of diethylene glycol monomethyl ether, diethylene glycol monoethyl ether, diethylene glycol monoisopropyl ether, diethylene glycol monobutyl ether, diethylene glycol monoisobutyl ether, dipropylene glycol monomethyl ether and triethylene glycol monobutyl ether.

2. The water-based ink according to claim 1, wherein a weighted mean value of a boiling point of the organic solvent (B) is not lower than 150° C. and not higher than 250° C.

3. The water-based ink according to claim 1, wherein a content of a trivalent or higher-valent polyhydric alcohol in the water-based ink is not more than 5% by mass.

4. The water-based ink according to claim 1, wherein a content of the polyhydric alcohol ether in the water-based ink is not less than 10% by mass and not more than 40% by mass.

5. The water-based ink according to claim 1, wherein a mass ratio of the pigment to the polymer particles (A) [pigment/polymer particles (A)] in the water-based ink is not less than 0.5 and not more than 4.

6. The water-based ink according to claim 1, wherein the polymer constituting the water-insoluble polymer particles (A) is a crosslinked polymer (A1) obtained by crosslinking an uncrosslinked polymer (a1) with a crosslinking agent, and the crosslinking agent is a polyglycidyl ether compound of a polyhydric alcohol comprising a hydrocarbon group having not less than 3 and not more than 8 carbon atoms.

7. The water-based ink according to claim 1 for ink-jet printing.

8. A printing method of printing characters or images on a printing medium using the water-based ink according to claim 1, in which a water absorption of the printing medium per a unit surface area thereof as measured by contacting the printing medium with pure water for 100 milliseconds is not less than 0 g/m² and not more than 10 g/m².

9. The water-based ink according to claim 1, wherein a crosslinking degree of the water-insoluble polymer particles (A) is not less than 10% and not more than 60%.

10. The water-based ink according to claim 6, wherein an acid value of the uncrosslinked polymer (a1) is not less than 5 mgKOH/g and not more than 320 mgKOH/g.

11. The water-based ink according to claim 6, wherein the uncrosslinked polymer (a1) is a carboxy group-containing uncrosslinked polymer that comprises a constitutional unit derived from (a1-1) a carboxylic acid monomer and a constitutional unit derived from (a1-2) a hydrophobic monomer.

12. The water-based ink according to claim 6, wherein a weight-average molecular weight of the uncrosslinked polymer (a1) is not less than 3,000 and not more than 100,000.

13. The water-based ink according to claim 1, wherein a content of water in the water-based ink is not less than 40% by mass and not more than 85% by mass.

14. The water-based ink according to claim 1, wherein a content of the pigment in the water-based ink is not less than 1% by mass and not more than 15% by mass.

15. The water-based ink according to claim 1, wherein a content of the polymer particles (A) in the water-based ink is not less than 0.5% by mass and not more than 10% by mass.

* * * * *